May 14, 1963   B. E. LENEHAN   3,090,006
INPHASE LOAD CURRENT MEASURING APPARATUS
Filed April 25, 1960

WITNESSES
John E. Heasley, Jr.
James F. Young

INVENTOR
Bernard E. Lenehan
BY
John L. Stoughton
ATTORNEY

# United States Patent Office 3,090,006
Patented May 14, 1963

3,090,006
INPHASE LOAD CURRENT MEASURING
APPARATUS
Bernard E. Lenehan, Bloomfield, N.J., assignor to Westinghouse Electric Corporation, East Pittsburgh, Pa., a corporation of Pennsylvania
Filed Apr. 25, 1960, Ser. No. 24,536
4 Claims. (Cl. 324—142)

This invention relates generally to current responsive apparatus and more particularly to such an apparatus for measuring the inphase current which is supplied to a reactive load such as an electric motor.

When ammeters are connected in the normal manner to measure the current flow to a reactive load, the total vector current is indicated. In many instances, this total vector current remains relatively constant with rather substantial changes in inphase current.

A prior art method of measuring inphase current in a single phase network is disclosed in Miller Patent No. 2,829,343. My construction is an improvement over that shown in the patent and may be used to measure inphase current in polyphase networks as well as in single phase networks. The construction as disclosed herein is also more versatile in that the range of current which it will measure accurately and its sensitivity is considerably greater than that shown in the patent.

It is a prime object of this invention to provide a new and improved apparatus for measuring inphase current supplied to a load which may be either inductive reactive or capacitive reactive.

Another object is to provide such an apparatus which is usable in single phase as well as polyphase circuits.

A further object is to provide such an apparatus which is simple and economical to manufacture and is highly sensitive to current changes.

A still further object is to provide such an apparatus which is suitable for use on a wide range of load types without the necessity of special calibration.

Figure 1:
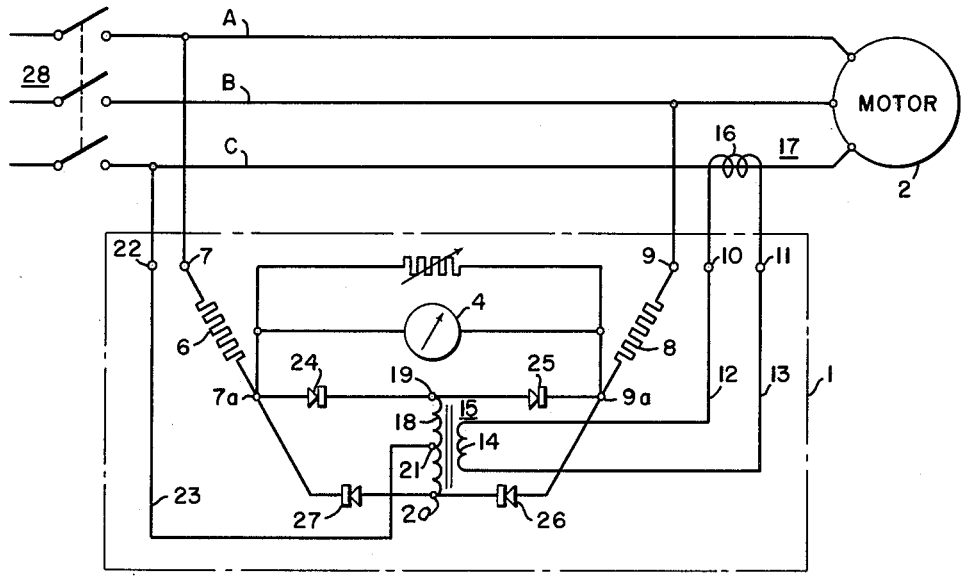
Figure 2:
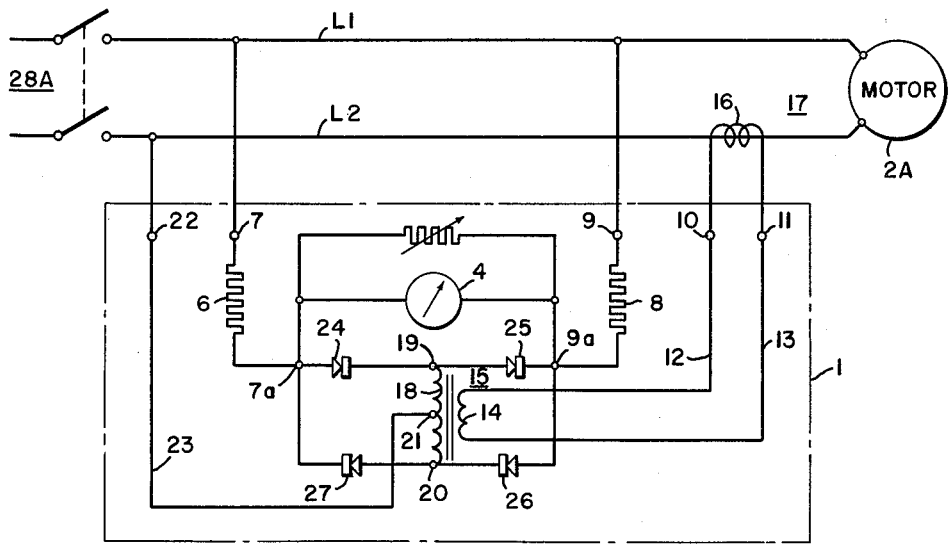

Other objects will be apparent from the specification, the appended claims, and the drawings, in which drawings:

FIGURE 1 schematically shows the apparatus connected to measure inphase power to a three phase load; and, FIG. 2 schematically shows the apparatus connected to measure power to a single phase load.

Referring to the drawings by characters of reference, the numeral 1 indicates generally an apparatus for indicating the amount of inphase current which is being supplied to a reactive load such as motor 2. The apparatus 1 comprises an electrical sensing instrument 4 which preferably takes the form of a direct current instrument of relatively low impedance. I have found that an instrument having a resistance of 60 ohms or under is quite satisfactory. The instrument 4 may be calibrated in terms of inphase amperes or if desired may be calibrated in terms of percentage of rated load current for the particular load with which it is associated.

The apparatus, which connected to a three phase circuit as shown in FIG. 1, is supplied with an electrical signal proportional to line voltage through the resistors 6 and 8. These resistors are of equal magnitude and may be of the order of 50,000 ohms for use on 220 volt circuits and 100,000 ohms for use on 440 volt circuits. One terminal 7 of the apparatus 1 to which the resistor 6 is connected is externally connected to the phase conductor A while the apparatus terminal 9 to which the resistor 8 is connected is externally connected to the phase conductor B. Apparatus terminals 10 and 11 are connected by conductors 12 and 13 respectively to a primary winding 14 of a current transformer 15 and externally to the secondary winding 16 of a current transformer 17 having its primary in series in the phase conductor C.

A center tapped secondary winding 18 of the transformer 15 has end terminals 19 and 20 and a center terminal 21. Apparatus terminal 22 is internally connected by conductor 23 to center terminal 21 and externally to phase conductor C. The terminal 19 is connected to the common point between a pair of series connected rectifiers 24 and 25 having their spaced terminals connected to terminals 7a and 9a. Similarly, the winding terminal 20 is connected to the common point between a second pair of series connected rectifiers 26 and 27 having their spaced terminals connected to terminals 9a and 7a respectively. It will be apparent that the rectifiers 24–27 are connected to form a ring modulator having control terminals 7a and 9a and controlled terminals 19 and 20 as will be explained below.

It is believed that the remainder of the apparatus may best be understood by a description of the operation thereof, as illustrated in FIG. 1, which is as follows. Closure of this switch 28 energizes the phase conductors A, B and C and power is supplied to drive the motor 2 in the usual manner. With the conductors energized current flows between phase conductor A and C through the resistor 6, one or the other of the rectifiers 24 and 27, the winding 18 and conductor 23. Current also flows between phase conductor B and C through the resistor 8, one or the other of the rectifiers 25 and 26, the winding 18 and conductor 23. The current flowing in conductor 23 will be in phase with the potential between phase C and neutral. An alternating current will flow between the phase conductors A and B through the resistors 6 and 8. At one relative polarity of these conductors this current will flow through rectifiers 24 and 25 and at the other relative polarity this current will flow through rectifiers 26 and 27. Only a relatively small portion of the current flow between conductors A and B will flow through the instrument 4 since the rectifiers are in shunt therewith. This small current which does flow through the instrument 4 is alternating current and since the instrument 4 is of the direct current type with the usual amount of inertia, it will be ineffective to actuate the instrument 4. This alternating current which flows through the instrument 4 will therefore be neglected in the further discussion of the operation of the apparatus 1.

It will be appreciated that during the intervals when the phase conductor A is positive with respect to phase conductor C, current will flow between the conductors A and C through the rectifier 24 while during the opposite polarity the current will flow between these conductors through the rectifier 27. Similarly, the current flow between the phase conductors B and C will be through the rectifiers 25 and 26 depending upon the relative polarity of these phase conductors B and C.

The energization of the transformer 15 by means of the current transformer 17 causes a potential to be established between the terminals 19 and 20 which is of the same phase as the current flowing in phase conductor C and which will cause a current to flow therebetween in proportion to the current flowing in phase conductor C. This current will flow through the instrument 4 which is connected between the terminals 7a and 9a. The paths for this current extend between the terminals 7a and 9a through one of the sets of rectifiers 24—26, 27—25, 25—27 or 26—24. It will be noted that the rectifiers of each set are oppositely poled. With this arrangement, current flows through the reversedly poled one of the rectifiers requires the flow of current therethrough from control source before current will flow due to the alternating potential established between the terminals 19 and 20 due to current flowing in phase conductor C.

This control current is derived from the potentials which appears between the phase conductors A and B and the phase conductor C. The voltage which appears between conductors A and C leads the phase C voltage by 30 electrical degrees while the voltage between conductors B and C lags the phase C voltage by 30 electrical degrees. These two voltages are simultaneously applied to the winding 18. Because of the transformer action in coil 18, a resultant current will flow therethrough which is in phase with the voltage of phase C (the potential between phase conductor C and neutral). This control current flows through the rectifiers 24—26 or 25—27 depending upon the instantaneous polarities of the conductors A, B and C.

The rendering of the rectifiers 24 and 26 conducting completes the output circuit through the instrument 4 and, depending upon the relative polarities at the terminals 19 and 20 with respect to that between the phase conductors A, B and C current will flow through the meter from terminal 7a to 9a or vice versa. It will be assumed that the relative polarities are such that with the current in conductor C in phase with the phase C voltage, the terminal 19 will be positive when current is flowing to phase conductor C and terminal 20 will be positive when current is flowing from phase C. When current flows to phase C through conductor 23, rectifiers 24 and 26 will be rendered conducting by the control current flowing from conductors A and B to C. The voltage appearing across the winding 18 caused by the transformer 17 will cause current to flow from terminal 19 through rectifier 24, instrument 4 and rectifier 26 to terminal 20. The magnitude of this current is proportional to that through the conductor C. When the current through the conductor C reverses thereby reversing the potentials between terminals 19 and 20, the control current through the conductor 23 will reverse and rectifiers 25 and 27 will be conducting. Current then flows from terminal 20 through rectifier 27, instrument 4, and rectifier 25 to terminal 19. In each instance the direction of current flow through the instrument is the same and the instrument will be energized proportionally to the total current in conductor C. In general terms, the controlled switching of the rectifiers acts to completely rectify the current when the phase thereof is the same as the phase of the voltage between conductor C and neutral.

If, however, the current in phase conductor C moves out of phase with the phase C voltage and the current in conductor 23, which has the same phase as the phase C voltage, the switching of the rectifiers 24—26 and 25—27 will not be in synchronism with the potential reversals of the current flowing in conductor C. When this happens, this output current flowing to the instrument 4 will not be fully rectified and a portion of this output current will flow in the opposite direction through the instrument 4. The portion of the current which flows reversedly through the instrument will balance out a portion of the forwardly flowing current and the instrument reading will be reduced even though the magnitude of the current in phase conductor C remains constant. In other words, a portion of the output current becomes alternating in character and thusly is ineffective to influence the instrument reading. It will now become apparent that the instrument 4 will respond only to that portion of the current which is in phase with the phase C voltage and the instrument 4 indicates inphase current and magnitude of the loading of the motor 2.

The apparatus 1 of FIG. 2 is substantially identical to apparatus 1 of FIG. 1. The difference between FIGS. 1 and 2 is that in FIG. 1 the apparatus 1 is associated with a three phase supply while in FIG. 2 the apparatus 1 is associated with a single phase potential supply.

In FIG. 2, the switching current is derived from the voltage between the supply conductors L1 and L2 and both of the apparatus terminals 7 and 9 are connected to L1 with the terminal 22 connected to line L2. With this arrangement the transformer 15 does not act to shift the phase of the current flowing through the resistors 6 and 8 to the conductor 23 but does provide a low impedance connection by which the current from transformer 17 may be supplied to the instrument 4. It will be readily apparent that the operation of the switching rectifiers will be in phase with the voltage supplied through conductors L1 and L2 to the single phase load 2A and the rectifiers 24—26 and 25—27 will be rendered conducting to rectify the current output of the transformer 15 due to the energization of the winding 14 whereby the instrument will indicate inphase current flowing to the load 2A substantially as described above.

The invention has been shown and described, in accordance with the patent statutes, in its presently preferred form. It is appreciated, however, that modifications may be made without departing from the spirit and scope thereof and the showing should be taken as illustrative rather than limitative and the scope of the invention is to be determined by the scope of the hereinafter appended claims.

What is claimed and is desired to be secured by United States Letters Patent is as follows:

1. An inphase current responsive apparatus responsive to inphase current being supplied to a current consuming device through a plurality of conductors comprising voltage and current input means adapted to be energized from said conductors first and second impedance elements, a transformer having first and second windings with electrically spaced winding terminals, said first winding having a winding terminal intermediate its said spaced winding terminals, a plurality of asymmetric current conducting devices connected in series to form a ring having first and second pairs of ring terminals, a first ring terminal of each said pair being spaced from the other ring terminal of the respective said pair by not less than two of said devices, said ring terminals of said first pair being electrically spaced from said ring terminals of said second pair by at least one said device, means connecting a first of said ring terminals of said first pair to said voltage input means and including one of said elements, means connecting the second of said ring terminals of said first pair to said voltage input means and including the other of said elements, means connecting said electrically spaced winding terminals of said first winding between said second pair of ring terminals, means connecting said spaced winding terminals of said second winding to said current input means, means connecting said intermediate winding terminal to said voltage input means, a translating device, said first pair of ring terminals being energized as a function of the magnitude of the inphase current, and means connecting said translating device across said first pair of ring terminals.

2. An inphase current responsive apparatus for responding to the loaded condition of an electrical load having at least three load terminals energized from a source of polyphase electrical energy comprising at least three apparatus terminals adapted to be connected individually to the load terminals, a first and a second resistor each having first and second terminals, a first pair of series connected rectifiers connected between said first terminals of said resistors, each said rectifier of said first pair being conductive in the same direction for flow of current between said first terminals of said first resistors in a first direction, a second pair of series connected rectifiers connected between said first terminals of said resistors, each said rectifier of said second pair being conductive in the same direction for flow of current between said first terminals of said resistors in a direction opposite to said one direction, a first transformer having first and second windings, means connecting said first winding between a first point intermediate said rectifiers of said first pair and a second point intermediate said rectifiers of said second pair, means connecting an intermediate portion of said first winding to a first of said apparatus terminals, means connecting said second terminal of said first resistor to a second of said apparatus terminals, means connecting said second terminal of said second resistor to a third of said apparatus terminals, means for energizing said second winding in accordance with the current flowing between the source and the load through the one of said load terminals which is connected to said first apparatus terminal, and an electrical quantity responsive apparatus connected between said first terminals of said resistors.

3. An apparatus of the character described for responding to the inphase current flowing to a reactive load from a source of polyphase electrical energy comprising at least three conductors adapted to connect said load to said source, a pair of current input terminals adapted to be energized by a current proportional to the current flowing in a first of said conductors, a current transformer having a winding means provided with a plurality of winding terminals, means connecting a first pair of said winding terminals to said current input terminals, a pair of output terminals, a first pair of asymmetric current flow devices connected together in series between said output terminals and having an intermediate terminal common to each said device of said first pair, a second pair of asymmetric current flow devices connected together in series between said output terminals and having an intermediate terminal common to each said device of said second pair, said devices of each pair being poled in the same direction, said devices of said first pair being poled in a direction opposite to said devices of said second pair, means connecting a pair of said winding terminals to said intermediate terminals, said winding means having a terminal intermediate said last-named pair of winding terminals, means connecting said last-named intermediate terminal to said first conductor, a first impedance device connected between one of said pair of output terminals and a second of said conductors, a second impedance device connected between the other of said pair of output terminals and a third of said conductors.

4. In combination, three electrical conductors adapted to connect a polyphase electrical load to a source of polyphase electrical energy, a first transformer having a secondary winding and having a primary winding connected in series in a first of said conductors, a second transformer having a secondary winding with a center tap connection and having a primary winding connected to be energized from said secondary winding of said first transformer, an electrical instrument having terminals, first and second pairs of rectifiers, each said pair being connected in series between said instrument terminals and having a terminal common to its said pair of rectifiers, said rectifiers of said first pair being polarized oppositely to said rectifiers of said second pair, means connecting said secondary winding of said second transformer across said common terminals of said pairs of rectifiers, means connecting said first conductor to said center tap, first and second resistors, means including said first resistor connecting one of said instrument terminals to a second of said conductors, and means including said second resistor connecting the other of said instrument terminals to a third of said conductors.

References Cited in the file of this patent

UNITED STATES PATENTS

| 2,282,396 | Cravath | May 12, 1942 |
| 2,414,318 | Middel | Jan. 14, 1947 |
| 2,492,556 | Gruchy | Dec. 27, 1949 |
| 2,829,343 | Miller | Apr. 1, 1958 |

FOREIGN PATENTS

| 1,096,213 | France | June 16, 1955 |